BRASSIERE PADS AND METHOD OF MAKING THE SAME

Original Filed July 26, 1965 9 Sheets-Sheet 1

INVENTOR
ABE SILVERMAN
BY Charles B. Cannon
His Atty

BRASSIERE PADS AND METHOD OF MAKING THE SAME
Original Filed July 26, 1965 9 Sheets-Sheet 2
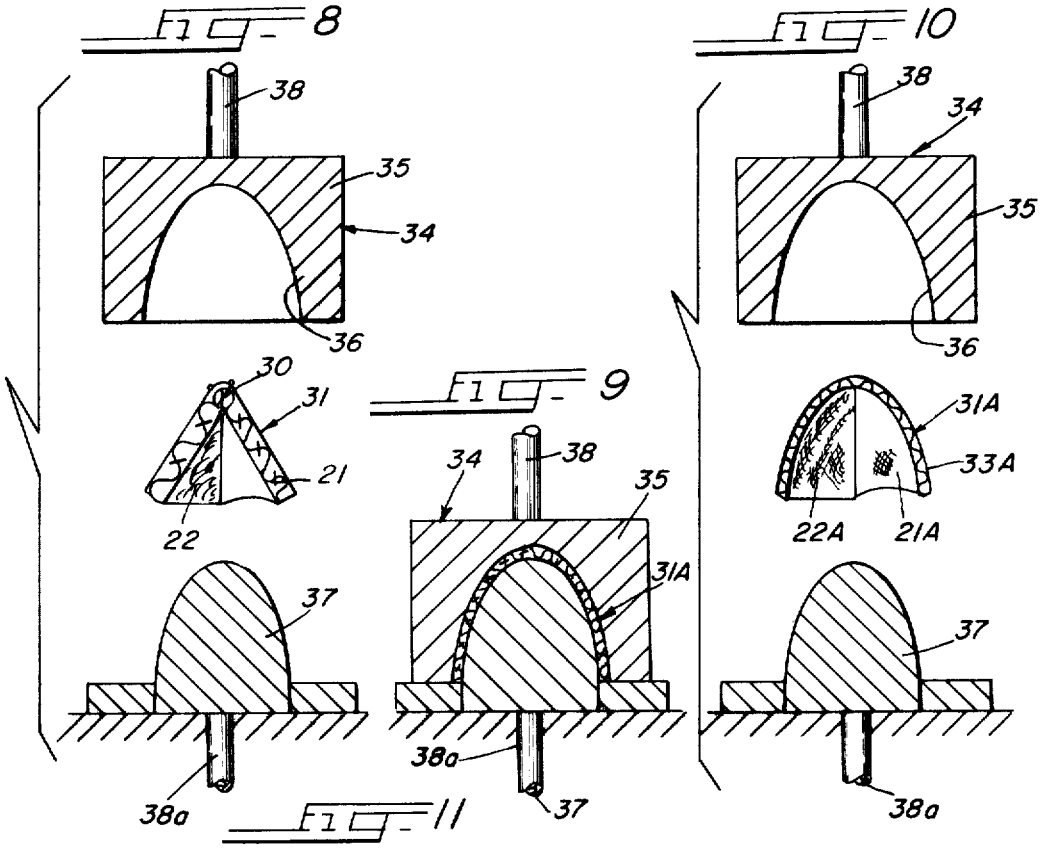
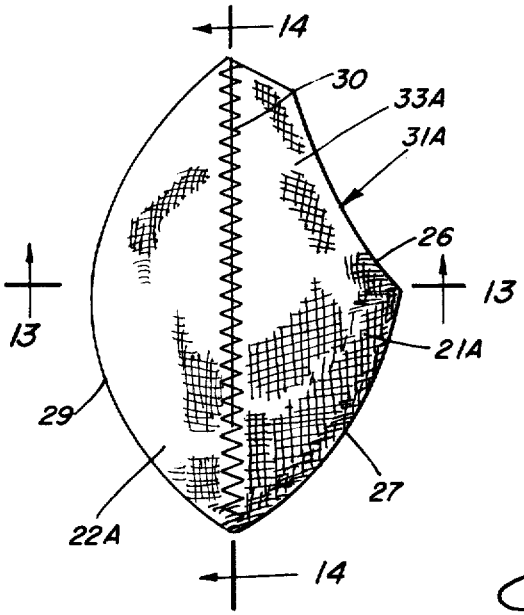
INVENTOR
ABE SILVERMAN
BY Charles B. Cannon
His Atty

BRASSIERE PADS AND METHOD OF MAKING THE SAME

Original Filed July 26, 1965 9 Sheets-Sheet 3

INVENTOR
ABE SILVERMAN

BY Charles B. Cannon
His Atty.

BRASSIERE PADS AND METHOD OF MAKING THE SAME

Original Filed July 26, 1965 9 Sheets-Sheet 4

INVENTOR.
ABE SILVERMAN
BY Charles B. Cannon
His Att'y.

BRASSIERE PADS AND METHOD OF MAKING THE SAME

Original Filed July 26, 1965 9 Sheets-Sheet 5

INVENTOR
ABE SILVERMAN
BY Charles B. Cannon
His Atty

BRASSIERE PADS AND METHOD OF MAKING THE SAME

Original Filed July 26, 1965 9 Sheets-Sheet 6

INVENTOR
ABE SILVERMAN
BY
Charles B. Cannon
His Atty.

BRASSIERE PADS AND METHOD OF MAKING THE SAME
Original Filed July 26, 1965 9 Sheets-Sheet 7
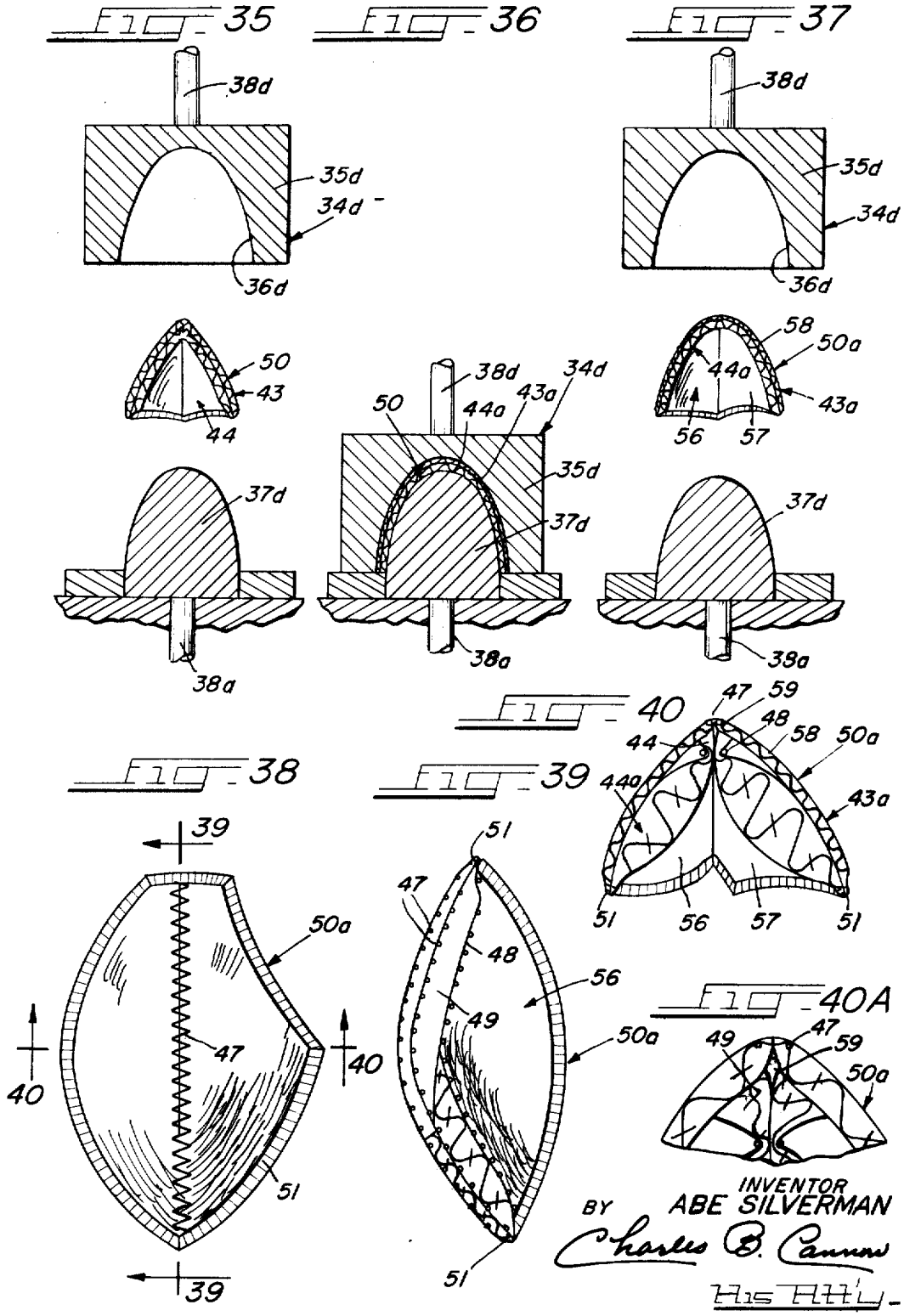

BRASSIERE PADS AND METHOD OF MAKING THE SAME
Original Filed July 26, 1965 9 Sheets-Sheet 8
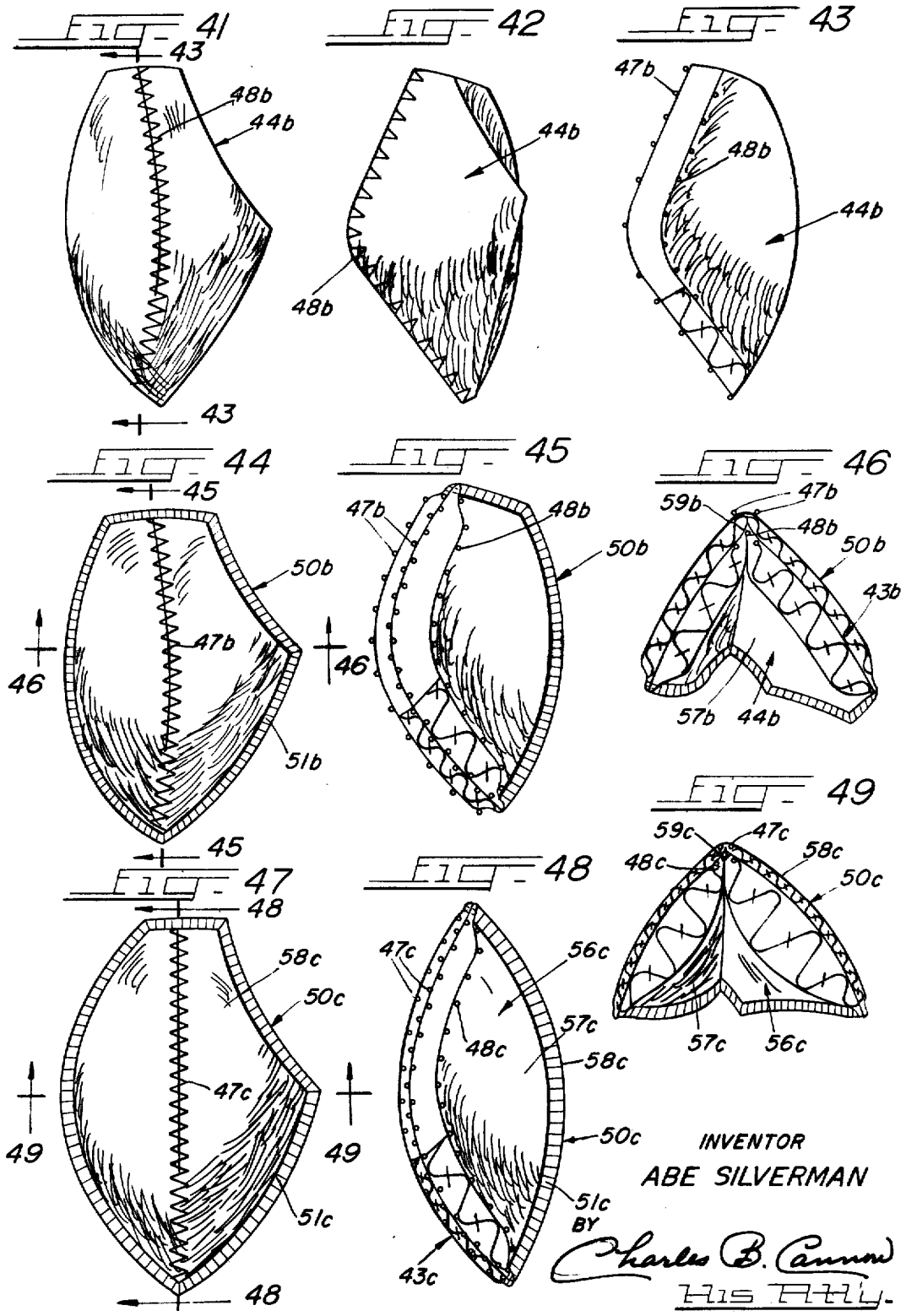

BRASSIERE PADS AND METHOD OF MAKING THE SAME

Original Filed July 26, 1965 9 Sheets-Sheet 9

INVENTOR
BY ABE SILVERMAN
Charles B. Cannon
His Atty.

United States Patent Office

Re. 26,790
Reissued Feb. 17, 1970

26,790

BRASSIERE PADS AND METHOD OF MAKING THE SAME

Abe Silverman, Chicago, Ill., assignor to Silveco Rubber Products Inc., Chicago, Ill., a corporation of Illinois Original No. 3,392,731, dated July 16, 1968, Ser. No. 474,703, July 26, 1965. Application for reissue Nov. 25, 1968, Ser. No. 803,136
Int. Cl. A41c *3/10*
U.S. Cl. 128—481 27 Claims

Matter enclosed in heavy brackets [ ] appears in the original patent but forms no part of this reissue specification; matter printed in italics indicates the additions made by reissue.

ABSTRACT OF THE DISCLOSURE

A stitched and molded brassiere pad is formed [by] *of* bonded nonwoven fibrous batting, made from polyester fiber or like material, which is cut, sized and shaped and stitched together in the absence of any external covering. The thus stitched pad is then molded to reduce the thickness thereof and to provide a smooth, skin-like surface directly on the outer surface of the body of the pad while leaving the inner surface, which is worn next to the body of the wearer, soft and fluffy.

This invention relates to brassiere pads and to a method of making the same, and more particularly, to polyester fiber brassiere pads and a method of making the same.

In the art of brassieres and brassiere pads it has been known heretofore to form brassiere pads from fibrous material by cutting out properly sized and shaped blanks of polyester fibrous material and stitching the same together to provide the finished article. One of the fibrous materials heretofore used for this purpose is known as bonded nonwoven fibrous batting, made of polyester fiber, and typical examples of such polyester fibers used in making such bonded nonwoven fibrous battings are Kodel (Eastman) and Dacron (Du Pont). However, heretofore in the art one of the problems involved in the use of such bonded nonwoven fibrous battings for use in making brassiere pads has been the fact that such materials, as are available commercially for use in making stitched brassiere pads, while being porous and light in weight are relatively thick or massive and rough and are non-uniform in thickness, and impart to the brassiere pad made therefrom a rather unattractive appearance.

Accordingly, an object of the present invention is to provide a new and improved stitched and molded or formed brassiere pad which is of reduced thickness, is light and neat in appearance, and has at least one smooth and skin-like surface which imparts a neat and attractive appearance to the new brassiere pad while, at the same time, the smooth skin-like surface thus applied to the new brassiere pad enables it to retain its molded form and shape and thus enables the new brassiere pad to maintain the cloth cup of a brassiere in which it is used in its desired outwardly fully extended form or shape.

An additional object of the present invention is to provide a new and improved stitched and molded brassiere pad in which the original thickness of the bonded nonwoven fibrous batting employed in making the new brassiere pad is substantially reduced, to provide a stitched and molded brassiere pad which is thinner and less massive and bulky in appearance than are the stitched fibrous brassiere pads heretofore known in the art while, at the same time, having a smooth, neat and attractive appearance.

Another object of the present invention is to provide a new and improved method of making the new and improved stitched and molded brassiere pad made from bonded nonwoven fibrous batting made of polyester fiber.

An additional object of the present invention is to provide a new and improved stitched and molded or formed brassiere pad formed of bonded nonwoven fibrous batting, made from polyester fiber, and having, in one form of the invention, a relatively soft, fluffy inner surface and a smooth skin-like outer surface having a neat and attractive appearance.

A further object of the present invention is to provide, in another form thereof, a new and improved stitched and molded or formed brassiere pad made of bonded nonwoven fibrous batting, made from polyester fiber, and adapted for use as a so-called contour pad, to give the brassiere in which it is used a shape-retaining feature.

Still another object of the invention is to provide, in one form of the invention, a new and improved relatively thick stitched and molded so-called full inflation brassiere pad made of bonded nonwoven fibrous batting, made from polyester fiber, and having smooth skin-like inner and outer surfaces, thereby presenting a neat and attractive appearance, and to provide a new and improved method of making such a new brassiere pad.

Another object of the invention is to provide in one form of the invention a so-called full-inflation brassiere pad which embodies a novel construction and arrangement of closely nested inner and outer liners which cooperate to strengthen the new brassiere pad and to maintain it and the cloth cup of a brassiere in which it is arranged in their desired fully extended position and against inward collapse so that the cloth cup of a brassiere in which the new brassiere pad is used will at all times impart to the brassiere of the user the desired full-inflation effect and appearance.

Another object of the invention is to provide in one form of the invention a so-called full-inflation brassiere pad which embodies a novel construction and arrangement of a channel formed in the inner surface of the outer liner and a projecting rib formed in the outer surface of the inner liner and projecting into the said channel in the outer liner when the inner and outer liners are assembled in closely nested relationship so as to strengthen the new brassiere pad and to maintain the new brassiere pad and the cloth cup of a brassiere in which it is arranged in their desired outwardly fully extended position and against inward collapse so that the cloth cup of a brassiere in which the new brassiere pad is used will at all times impart to the brassiere of the user the desired full-inflation effect and appearance.

Other objects will appear hereinafter.

In the drawings:

FIG. 8 is an exploded schematic sectional view illustrating one form of the stitched but unmolded full brassiere pad of the present invention prior to the molding or forming operation;

FIG. 9 is a schematic sectional view illustrating the form of the stitched full brassiere pad of the present invention in the process of being molded or formed and as it appears during the molding or forming operation;

FIG. 10 is an exploded schematic sectional view similar to FIG. 8 but showing one form of the new full brassiere pad of the present invention stitched and molded after the completion of the molding operation;

FIG. 11 is a front elevational view illustrating one form of the new full brassiere pad of the present invention;

FIG. 35 is a view similar to FIG. 8 but illustrating the modification of the invention shown in FIGS. 23 to 34, inclusive, with the top and bottom or outer and inner liners assembled and stitched together but prior to the forming or molding operation;

FIG. 36 is a view similar to FIG. 9 showing the modification of the invention illustrated in FIGS. 23 to 35, inclusive, during the forming or molding operation;

FIG. 37 is a view similar to FIG. 10 showing the modification of the invention illustrated in FIGS. 23 to 36, inclusive, after the completion of the forming or molding operation;

FIG. 38 is a front elevational view illustrating the new form of the breast pad shown in FIGS. 23 to 37, inclusive, after the completion of the forming or molding operation;

FIG. 39 is a longitudinal sectional view on line 39—39 in FIG. 38;

FIG. 40 is a transverse sectional view on line 40—40 in FIG. 38;

FIG. 40A is an enlarged fragmentary sectional detail view of the upper portion of the parts, including the interfitting rib and channel, shown in FIG. 40;

FIG. 41 is a front elevational view illustrating another modification of the new full-inflation brassiere pad;

FIG. 42 is a side elevation of the unit illustrated in FIG. 41;

FIG. 43 is a longitudinal sectional view on line 43—43 in FIG. 41;

FIG. 44 is a front elevational view of the unit shown in FIGS. 41 and 43 assembled before the forming or molding operation;

FIG. 45 is a longitudinal sectional view on line 45—45 in FIG. 44;

FIG. 46 is a transverse sectional view on line 46—46 in FIG. 44;

FIG. 47 is a front elevational view of the modification shown in FIGS. 41 to 46, inclusive, after the completion of the forming or molding operation;

FIG. 48 is a longitudinal sectional view on line 48—48 in FIG. 47;

FIG. 49 is a transverse sectional view on line 49—49 in FIG. 47;

Figure 53:
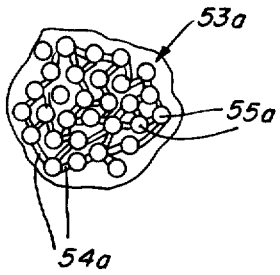
Figure 52:
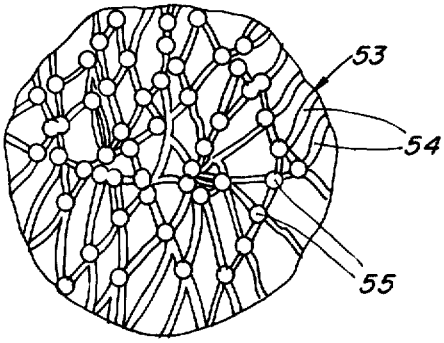

FIG. 52 is an enlarged fragmentary plan view of a typical form of the bonded nonwoven fibrous batting employed in the practice of the present invention as it appears prior to the forming or molding operation which is employed in the practice of the present invention; and FIG. 53 is an enlarged fragmentary sectional view illustrating the bonded nonwoven fibrous batting illustrated in FIG. 52 after forming or molding operation which is employed in the practice of the present invention.

Figure 1:
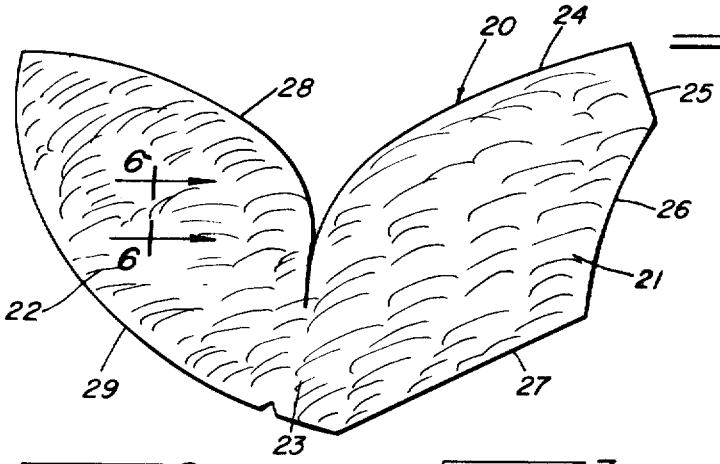
FIG. 1 is a plan view of a blank of bonded nonwoven fibrous batting from which the stitched and molded or formed so-called full brassiere pad of the present invention is made.
Figure 2:
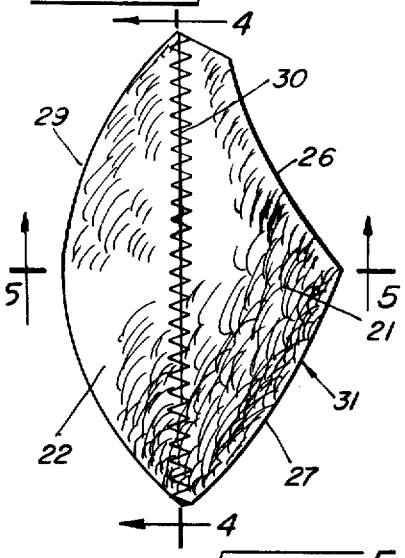
FIG. 2 is a front elevational view of a stitched but unmolded full brassiere pad formed from the blank shown in FIG. 1.
Figure 3:
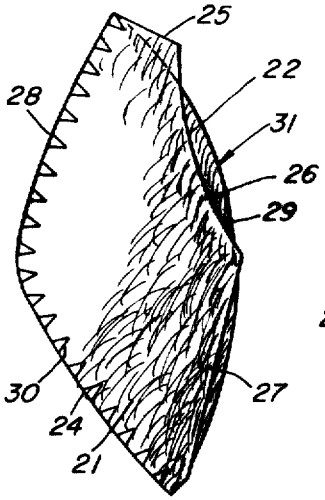
FIG. 3 is a side elevational view of the stitched but unmolded full brassiere pad shown in FIG. 2.
Figure 4:
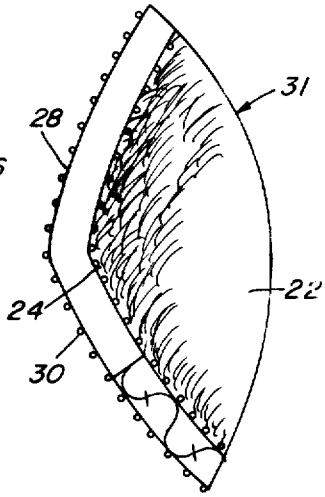
FIG. 4 is a vertical central longitudinal sectional view on line 4—4 in FIG. 2.

A typical embodiment of the new stitched and molded polyester fiber brassiere cup, and a typical method of making the same, are illustrated in FIGS. 1 to 16, inclusive, of the drawings and the new brassiere pad is formed from a blank 20 illustrated in FIG. 1, of any suitable soft, flexible bonded nonwoven fibrous batting formed of polyester fiber such, for example, as Kodel (Eastman) or Dacron (Du Pont).

Thus, a typical form of the bonded nonwoven fibrous batting material which may be used in the practice of this invention is exemplified by the material which is described in an article entitled "Fiberfill—What Is It?" which appears in Corset & Underwear Review magazine for June 1965, commencing at page 154, by Joseph F. Baigas, Jr., and a suitable quality of this material for use in the practice of the present invention is that which is therein referred to as made by Kem-Wove Industries, Inc. This material is characterized by possessing strength in all directions, high resilience, and excellent washability.

Such a material is diagrammatically illustrated in FIGS. 52 and 53 of the drawings of the present application, and an enlarged plan view of such a material is indicated generally at 53 in FIG. 52 and includes a mass or body of multi-directional polyester fibers 54 which intersect each other in random fashion at numerous points and such fibers are deep bonded together at their points of intersection, as at 55, by means of a suitable thermoplastic resinous adhesive bonding material which is sprayed thereon and throughout the entire body of the material, as distinguished from surface spray penetration, as is well understood in the art. The same mass or body of deep bonded nonwoven fibrous batting material indicated at 53, in FIG. 52, is shown in FIG. 53 in the form in which it appears after it has been compressed by being subjected to heat and pressure in the forming or molding operation employed in the practice of the present invention, and as used in making the new brassiere pads; those parts in FIG. 53 corresponding to similar parts in FIG. 52 being given the same reference numerals followed by the additional and distinguishing reference character a. The heat and pressure thus employed in the molding operation of the present invention softens the thermoplastic resinous bonding material, as distinguished from the polyester fibers, thus permitting the bonded nonwoven batting material to be molded or formed into the desired shape.

In the practice of the present invention, the bonded nonwoven fibrous batting material employed in making the new brassiere pads, and as referred to hereinbefore and hereinafter, may have a binder content of from approximately thirty percent (30%) to [aprpoximately] *approximately* fifty percent (50%) and a fiber content of from approximately seventy percent (70%) to approximately fifty percent (50%).

The blank 20 may be of any suitable design, shape and configuration, depending upon the brassiere pad design to be made therefrom, and is shown, for the purpose of illustration, but without limitation, as comprising panels 21 and 22 which are partially interconnected by a web portion 23. The panel 21 has a curved marginal edge portion 24, a relatively straight and short marginal edge portion 25, a curved marginal portion 26, and a relatively straight marginal edge portion 27, and the marginal edge portion 27 interconnects with and merges into a curved marginal portion 29 of the panel 22 which also has a curved marginal edge portion 28 (FIG. 1).

Figure 6:
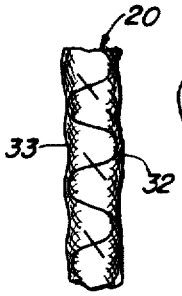
FIG. 6 is a fragmentary sectional view illustrating the fibrous material employed in making the new full brassiere pad and illustrating its relative thickness and rough interior and exterior surfaces.
Figure 7:
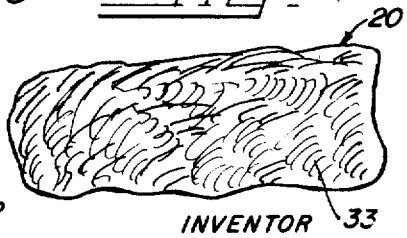
FIG. 7 is a fragmentary plan view of the material illustrated in FIG. 6 and which is used in making one form of the new brassiere pad.
Figure 12:
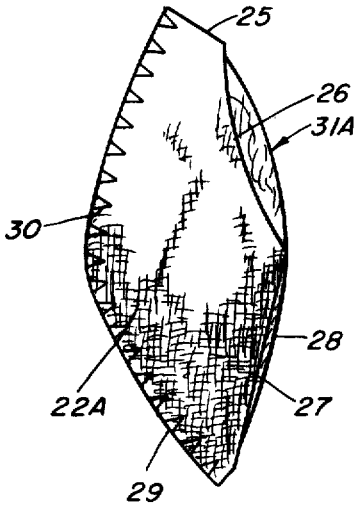
FIG. 12 is a side elevational view of the form of the new full brassiere pad shown in FIGS. 1 to 11, inclusive, of the drawings.

In the practice of the present invention, as illustrated in FIGS. 1 to 16, inclusive, of the drawings, the first step in the operation of making the new stitched and molded brassiere pad is to abut the edges 24 and 28 of the panels 21 and 22, respectively, of the blank 20, and then to stitch the panels 21–22 together, as at 30, along their complementary marginal edge portions 24 and 28, as shown in FIGS. 2, 3, 4 and 5. In this partially formed and stitched but unmolded or unformed condition the body 31 of the new brassiere pad has the transverse cross-sectional form illustrated in FIG. 5, and in which the panels 21 and 22 are stitched together as at 30, thereby imparting a rather sharp and generally triangular shaped form of the brassiere pad, thus stitched but unmolded or unformed. At this point in the operation the material employed in making the blank 20 has the relatively rough inner and outer surfaces indicated at 32 and 33, respectively (FIGS. 6 and 7).

The next step in the operation of forming the new stitched and molded or formed brassiere pad is illustrated in FIGS. 8 and 9 of the drawings and comprises the use of a mold 34 which includes a female mold member or platen 35 having a mold cavity 36 therein, and a male mold member 37 which is adapted to fit into the mold cavity 36 in the female mold member or platen 35.

Figure 5:
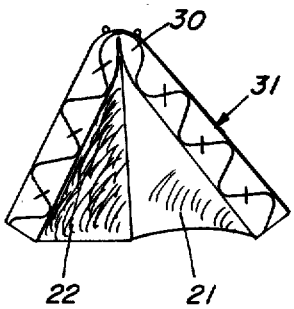
FIG. 5 is a transverse sectional view on line 5—5 in FIG. 2 of the new stitched but unmolded full brassiere pad shown in FIG. 2.

In the practice of the form of the invention illustrated in FIGS. 1 to 16, inclusive, either the female mold member or platen 35 may be heated by suitable electrical heating means 38 or 38a, respectively, and in the practice of the present invention the stitched but unmolded brassiere pad 31, having the form illustrated in FIGS. 5 and 8, is inserted into the male mold member 37, whereupon the heated female mold member or platen 35 is then brought down, under pressure, onto the stitched but unmolded brassiere pad 31 so that the stitched but unmolded brassiere pad 31 is heated and compressed and its cross-sectional thickness is substantially reduced, as may be seen by comparing FIGS. 5 and 8 with FIGS. 9, 10, 13, 14 and 15.

Alternatively, or in addition, the male mold member 37 may be heated, by suitable electrical heating means 38a (FIG. 10).

The temperature of the female mold member or platen 35, or of the male mold member 37, in the molding operation illustrated in FIGS. 8 and 9 is probably in the order of from 300° F. to 600° F. depending, in part, upon the particular bonded nonwoven fibrous batting material employed in making the new brassiere pad, and the characteristics desired in the resulting brassiere pad including its relative thickness, hardness, skin-like smooth or rough surfaces, and other characteristics.

Figure 13:
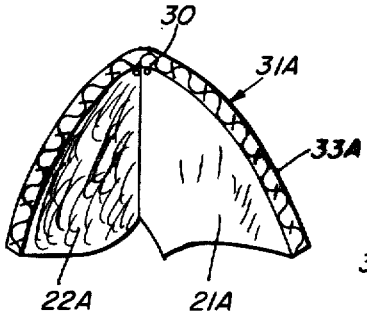
FIG. 13 is a transverse sectional view on line 13—13 of FIG. 11.
Figure 14:
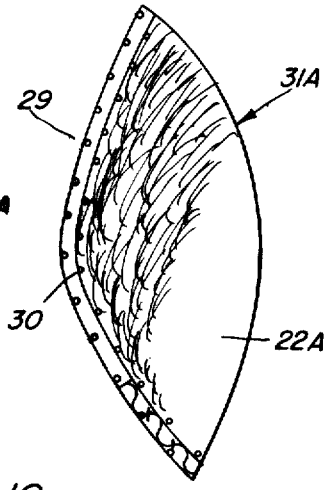
FIG. 14 is a vertical sectional view on line 14—14 in FIG. 11.
Figure 15:
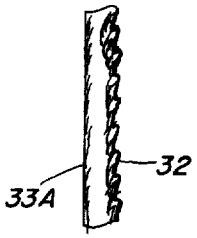
FIG. 15 is an enlarged fragmentary sectional view showing a portion of the bonded nonwoven fibrous batting material embodied in the new stitched and molded full brassiere pad shown in FIGS. 1 to 14, inclusive, after the completion of the molding or forming operation and showing the smooth and skin-like outer surface formed thereon.
Figure 16:
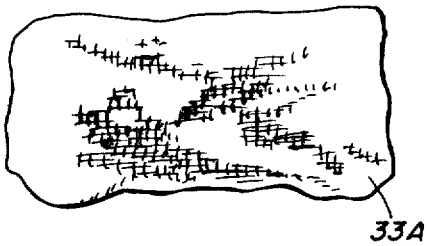
FIG. 16 is a fragmentary plan view of the material shown in FIG. 15.

After the molding or forming operation has been completed, the mold members 35 and 37 are disassembled and the then stitched and molded brassiere pad has the form illustrated at 31A (FIG. 11) and in this completed form the panels 21A and 22A of the new stitched and molded brassiere pad 31A have a thickness which is substantially reduced from that of the blank 20 and from the thickness it has in its stitched but unmolded form, as may be seen by comparing FIGS. 13 and 14 with FIGS. 5 and 8.

At the same time, that is, during the molding or forming operation, the outer surface 33A of the new stitched and molded brassiere pad is given a smooth and skin-like appearance which, together with its reduced thickness, imparts a neat and attractive appearance to the new stitched and molded brassiere pad.

In making the so-called full brassiere pads in accordance with the practice of the present invention, as illustrated in FIGS. 1 to 16, inclusive, the bonded nonwoven fibrous batting material employed preferably has an initial thickness in the order of from about ¾" to about 1" prior to the forming or molding operation, and after the forming or molding operation, the thickness of the material is preferably in the order of from about ⅜" to about ⅝".

Figure 17:
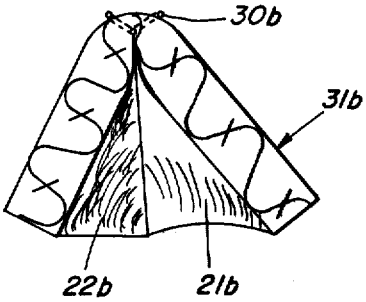
FIG. 17 is a fragmentary sectional view similar to FIG. 5 but showing another embodiment of the invention in the form of a stitched but unmolded or unformed so-called contour brassiere pad made of relatively heavy bonded non-woven fibrous batting made from polyester fiber.
Figure 18:
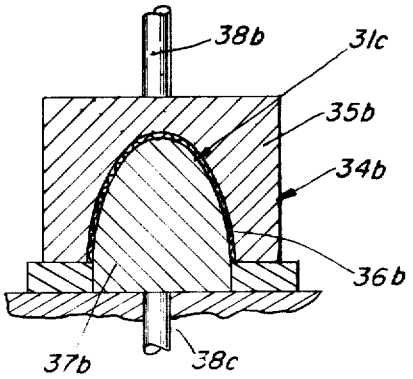
FIG. 18 is a schematic sectional view, similar to FIG. 9, but showing the stitched and unmolded contour brassiere pad illustrated in FIG. 17 as it appears during the molding operation.
Figure 19:
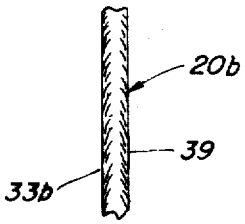
FIG. 19 is an enlarged fragmentary sectional view of the material embodied in the new contour brassiere pad shown in FIG. 18, and showing the smooth skin-like inner and outer surfaces thereon.

A modification of the invention is illustrated in FIGS. 17, 18 and 19 of the drawings and those parts in this form of the invention which are similar to or comparable to corresponding parts in the form of the invention illustrated in FIGS. 1 to 16, inclusive, of the drawings have been given similar reference numerals followed by the additional and distinguishing reference character b or c, as will be explained hereinafter.

The stitched but unmolded form of the new brassiere pad 31b illustrated in FIG. 17 of the drawings, and the completed stitched and molded form thereof illustrated in FIGS. 18 and 19, are adapted for use as so-called contour brassiere pads which are adapted for use in giving the cloth brassiere cups in which they are used a form-retaining shape.

Thus, in the form of the invention illustrated in FIGS. 17, 18 and 19 the stitched but unmolded brassiere pad 31b (FIG. 17) is inserted into the mold 34b (FIG. 18) and heat is applied to both the female mold member or platen 35b and to the male mold member or platen 37b, with the result that the heat and pressure thus applied to the stitched but unmolded [brasier] *brassiere* pad 31b (FIG. 17) compresses the stitched but unmolded or unformed form of the [brassier] *brassiere* pad 31b (FIG. 17) into the relatively thin and completed form of the stitched and molded form of the new contour brassiere pad 31c of reduced thickness, as shown in FIG. 18, and which has smooth skin-like outer and inner surfaces 33b and 39, respectively, as shown in FIG. 19.

In making the contour form of the new brassiere pads according to the practice of the present invention, and as described above particularly in reference to FIGS. 17, 18 and 19 of the drawings, the preferred initial thickness of the bonded nonwoven fibrous batting material employed is in the order of from about ¾" to about 1" and the preferred thickness of the finished and molded contour brassiere pad after the completion of the forming or molding operation is in the order of from about ⅛" to about ¼".

The new contour brassiere pads made in accordance with the present invention, and as illustrated in FIGS. 18 and 19, serve in use as shape retainers for the cloth cups of brassiere in which they are used. As will be noted from the foregoing description and comparing FIGS. 17, 18 and 19 with FIGS. 9, 10 and 15, the new contour pads are substantially thinner than the so-called full pads of FIGS. 1 to 16, inclusive, as hereinbefore described.

Figure 20:
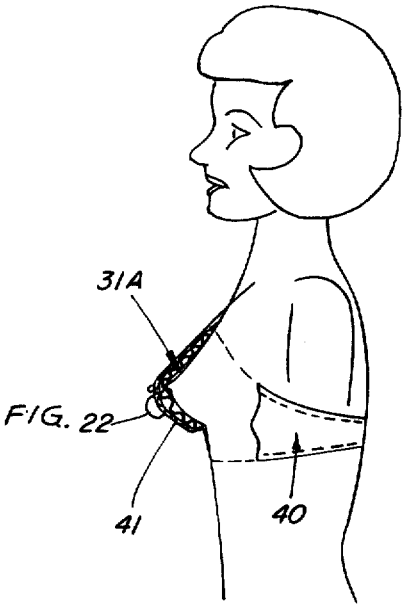
FIG. 20 is a fragmentary vertical cut-away sectional view illustrating a brassiere having one form of the new brassiere pad arranged in the cloth cup of the brassiere.
Figure 22:
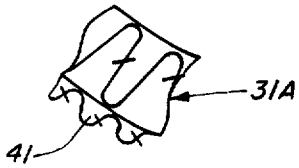
FIG. 22 is an enlarged fragmentary view of the encircled area shown in FIG. 20.
Figure 21:
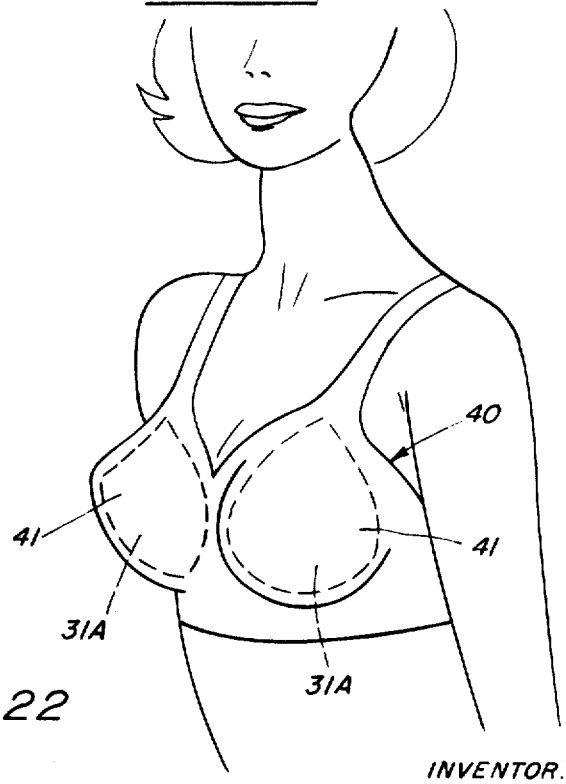
FIG. 21 is a perspective view illustrating a brassiere having one form of the new brassiere pad arranged in the cloth cups of the brassiere.

FIGS. 20 and 21 of the drawings illustrate the new stitched and molded or formed full brassiere pads 31A (FIGS. 1 to 16) or the so-called contour pad 31C of FIGS. 17, 18 and 19 as they appear when used in the cloth brassiere cups 41 of a brassiere 40.

Figure 23:
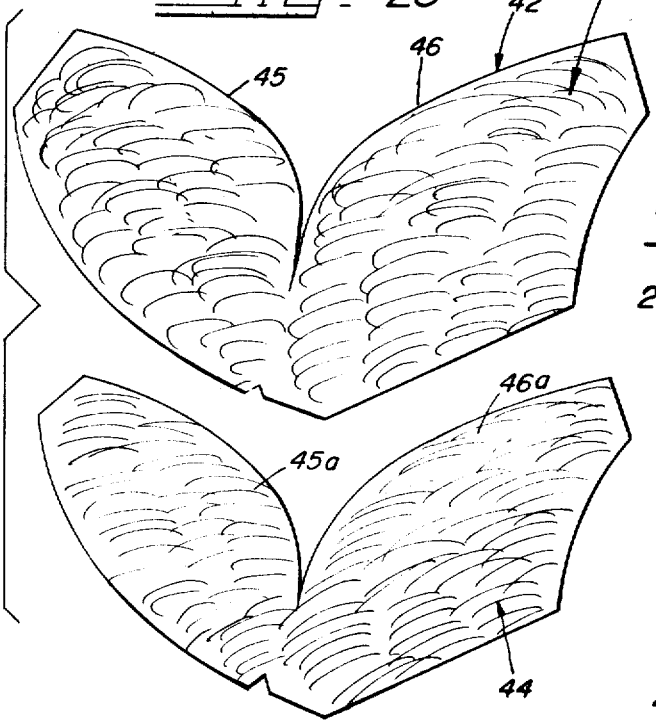
FIG. 23 is a plan view of the top and bottom or outer and inner blanks of the bonded nonwoven fibrous batting material employed in making a modification of the present invention in the form of a so-called full inflation brassiere pad.
Figure 24:
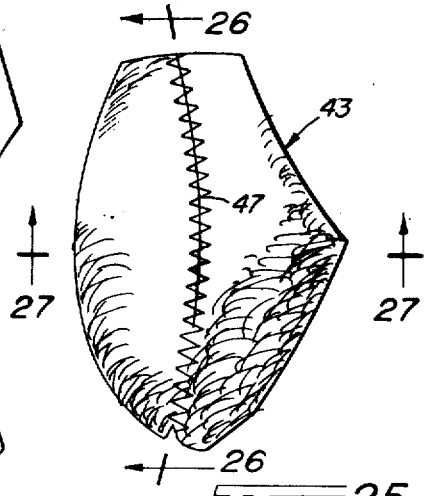
FIG. 24 is a front elevational view of the top or outer liner shown in FIG. 23 after it has been stitched into assembled position.

Another form of the invention is generally indicated at 42 in FIGS. 23 to 40, inclusive, of the drawings, and is comprised of a pair of complementary blank units of the bonded nonwoven fibrous batting material referred to above, and as illustrated in [FIGS. 52 and 53] *FIG. 23* of the drawings, including a top or outer blank unit 43 and a bottom or inner blank unit 44, both of these blank units 43 and 44 being of substantially the same thickness as blank units which are employed in making the form of the invention illustrated in FIGS. 1 to 22, inclusive. Thus, the form of the invention illustrated in FIGS. 23 to 40, inclusive, is designed for use in making a so-called full-inflation pad for use by girls and women having relatively small busts.

The top or outer blank unit 43, as shown in FIG. 23, has a pair of complementary curved marginal edge portions 45 and 46 and the bottom or inner blank unit 44 has corresponding curved marginal edge portions 45a and 46a.

Figure 25:
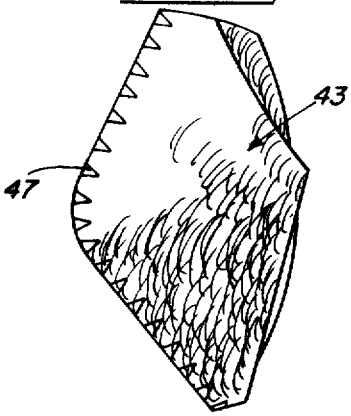
FIG. 25 is a side elevational view of the unit shown in FIG. 24.
Figure 26:
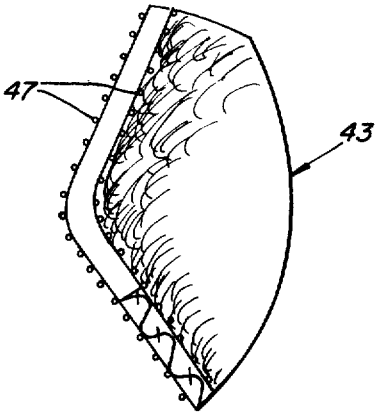
FIG. 26 is a longitudinal sectional view on line 26—26 in FIG. 24.
Figure 27:
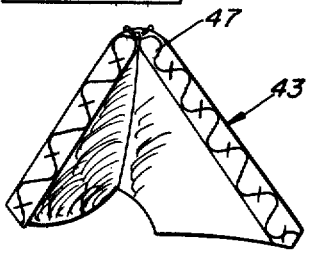
FIG. 27 is a transverse sectional view on line 27—27 in FIG. 24.
Figure 28:
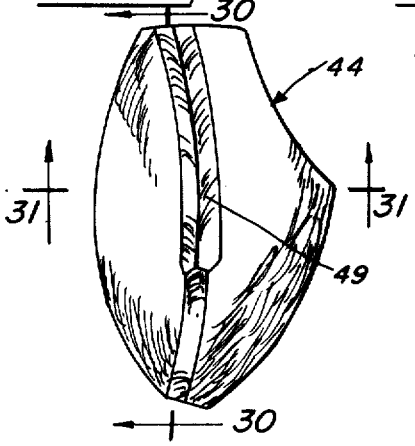
FIG. 28 is a front elevational view of the bottom or inner liner shown in FIG. 23 after it has been folded and stitched into assembled form.
Figure 29:
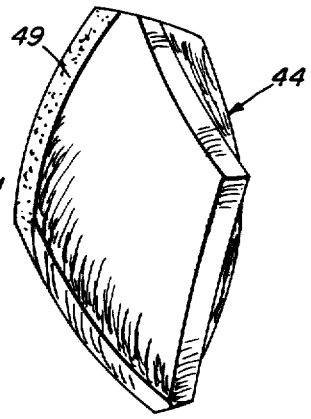
FIG. 29 is a side elevational view of the unit illustrated in FIG. 28 as seen from the right-hand side in FIG. 28.
Figure 30:
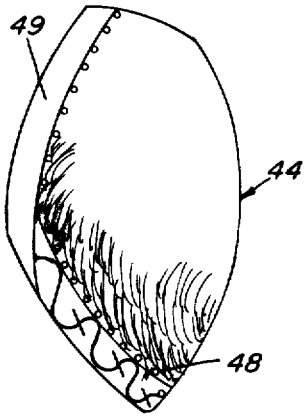
FIG. 30 is a longitudinal sectional view on line 30—30 in FIG. 28.
Figure 31:
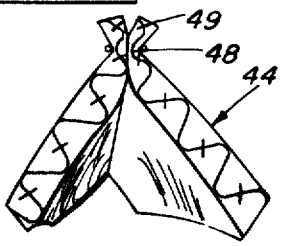
FIG. 31 is a transverse sectional view on line 31—31 in FIG. 28.

In the practice of that form of the invention illustrated in FIGS. 23 to 40, inclusive, and in making the so-called full-inflation brassiere pad 42 therein shown, the first step in the operation is that the marginal edge portions 45 and 46 are brought into abutting relationship with each other, whereupon these marginal edge portions 45 and 46 are then stitched together, as at 47, so as to provide the stitched but unmolded top or outer liner 43 which is illustrated in FIGS. 25, 26 and 27 of the drawings.

The bottom or inner blank unit 44 is then folded upon itself so as to bring the marginal edge portions 45a and 46a into folded relationship with each other, whereupon the marginal edge portions 45a and 46a of the bottom blank or inner liner unit 44 are then stitched together, as at 48, somewhat inwardly of the outer marginal edges thereof, thereby forming a projecting rib portion 49 thereon, the rib portion 49 extending longitudinally of the stitching 48 outwardly thereof, as shown in FIGS. 29, 30, 31, 40 and 40A.

Figure 32:
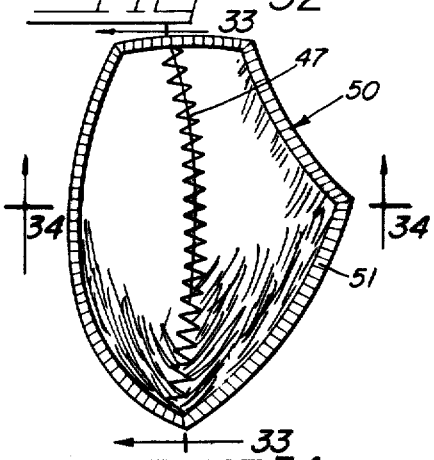
FIG. 32 is a front elevational view showing the top and bottom or outer and inner liner units illustrated in FIGS. 23 to 31, inclusive, stitched and assembled together but illustrating the same as they appear prior to the forming or molding operation.
Figure 33:
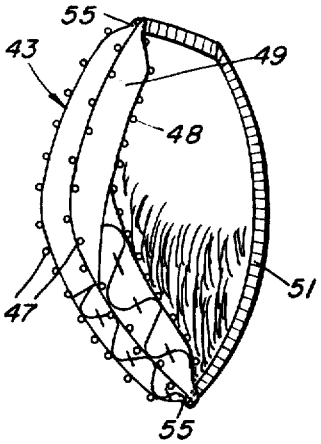
FIG. 33 is a longitudinal sectional view on line 33—33 in FIG. 32.
Figure 34:
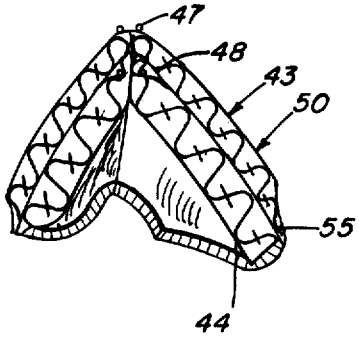
FIG. 34 is a transverse sectional view on line 34—34 in FIG. 32.

The thus stitched top or outer liner unit 43 and the thus folded and stitched bottom or inner liner unit 44 are thereupon assembled together by inserting the inner liner unit 44 into the outer liner unit 43, in closely nested relationship. The thus assembled and stitched top or outer liner unit 43 and the inner folded and stitched unit 44 are then stitched together, as at 51, as shown in FIGS. 32, 33 and 34 of the drawings, to provide the stitched and assembled composite but unmolded brassiere pad unit 50 for making the new full-inflation brassiere pad. The thus stitched and assembled unit 50 is then subjected to the forming or molding operation under heat and pressure, as indicated in FIGS. 35, 36 and 37 of the drawings, those parts illustrated in FIGS. 35, 36 and 37 which correspond to similar parts illustrated in FIGS. 8, 9 and 10 of the drawings have been given the same reference numerals followed by the additional and distinguishing reference characters d and e.

Either one or both of the male and female mold members 37d and 35d (FIG. 35) may then be heated (FIG. 36) by means of suitable electric current, and to a temperature within the range hereinbefore specified, electrical current supply lines being indicated diagrammatically at 38e and 38d, respectively. The assembled, stitched and molded brassiere pad unit 50, after the forming or molding operation, appears in the form in which it is shown in FIG. 37 of the drawings, and wherein it is generally indicated at 50a.

Thus, it will be noted that in the form of the invention embodied in the new so-called full-inflation brassiere pad made in accordance with the procedures illustrated in FIGS. 23 to 27, inclusive, of the drawings, the assembled and stitched and formed or molded brassiere pad unit 50a (FIGS. 37, 38, 39 and 40) is comprised of the outer liner unit 43a and the inner liner unit 44a which are so designed, stitched and formed or molded so as to provide a relatively small breast-receiving pocket 56 for use by girls and women with relatively small bosoms while, at the same time a smooth, skin-like surface may be imparted to the inner surface 57 of the inner liner 44a and to the outer surface 58 of the outer liner 43a of the complete and formed or molded brassiere pad by forming or molding operation illustrated in FIGS. 35 to 37, inclusive, as desired. However, if desired, such a smooth, skin-like surface may be imparted to only one of such surfaces 57 and 58.

The smooth skin-like surface thus imparted selectively to either or both of the surfaces 57 and 58, as desired, in addition to providing a neat and attractive appearance, also serve to retain the new brassiere pad in the form and shape in which it has been formed or molded so that in use it will tend to keep the cloth cup of a brassiere in which it is used in its desired outwardly fully extended form or shape. This smooth, skin-like surface is provided, in part, during the forming or molding operation, by the softening and resultant flow of the thermoplastic adhesive binder used in making the deep sprayed bonded non-woven fibrous batting material employed in making the new brassiere pads of the present invention, as pointed out above.

It will be noted, in this connection, that in the form of the new so-called full-inflation brassiere pad made in accordance with the procedures illustrated in FIGS. 23 to 40 and 40A, inclusive, of the drawings, the marginal rib portion 49 formed on the inner liner 44a projects into and is closely nested in a correspondingly and generally V-shaped channel 59 which is formed in inner surface of the outer assembled and stitched liner unit 43a and extends longitudinally thereof inwardly of the stitching 47 (FIGS. 40 and 40A). However, during the forming or molding operation, this rib 49 is substantially flattened and is, in effect, fused into the channel 59 in the body of the outer liner unit 43a. In use, the rib and channel 49–59 add bulk and mass to the completed full-inflation brassiere pad 50a, so as to better enable the completed brassiere pad to fill out the cloth cups of a brassiere into which it is inserted in use while, at the same time, aiding in strengthening the brassiere pad and holding the brassiere pad in its desired formed or molded condition so as to enable it in use to maintain the cloth cup of a brassiere in which it is used in fully inflated condition.

A modification of the new so-called full-inflation brassiere pad is illustrated in FIGS. 41 to 49, inclusive, of the drawings, in which those parts which are similar to or comparable to corresponding parts in the forms of the invention illustrated in FIGS. 23 to 40 and 40A, inclusive, have been given the same reference numerals followed by the additional and distinguishing reference character b, as to the parts of the assembled and stitched but unmolded brassiere pad, and by the additional and distinguishing reference character c as to the parts of the assembled, stitched and formed or molded brassiere pad.

Thus, the form of the invention illustrtted in FIGS. 41 to 49, inclusive, of the drawings is substantially similar to that illustrated in FIGS. 23 to 40, inclusive, and is made by substantially the same method, except that in this form of the invention the projecting rib portion 49 on the inner liner unit 44, which is embodied in the form of the invention illustrated in FIGS. 23 to 40 and 40A, inclusive, is eliminated and the outer and inner liner units 43b and 44b, respectively, are merely assembled loosely together, as at 51b, in closely nested relationship, to provide a relatively large and massive full-inflation brassiere pad having therein a relatively small breast-receiving pocket 56c (FIGS. 48, 49). While in the form of the invention illustrated in FIGS. 41 to 49, inclusive, of the drawings, the rib portion 49 embodied in the form of the invention illustrated in FIGS. 23 to 40 and 40A, inclusive, is eliminated, some of the material of the inner liner 44b is forced into the channel 59b (FIG. 46) or 59c (FIG. 49) during and as a result of the molding operation, thereby strengthening the completed full-inflation brassiere pad.

In making the so-called full-inflation brassiere pads illustrated in FIGS. 23 to 51, inclusive, and as hereinbefore described, the total initial thickness of the double ply bonded nonwoven fibrous batting material employed is preferably in the order of from about 1½" to about 1¾" consisting of two plies of the said batting material each being from about ¾" to about 1" in thickness, and in which the thickness of the new formed or molded full-inflation brassiere pad after completion of the molding operation is preferably in the order of from about 1¼" to about 1½".

Figure 50:
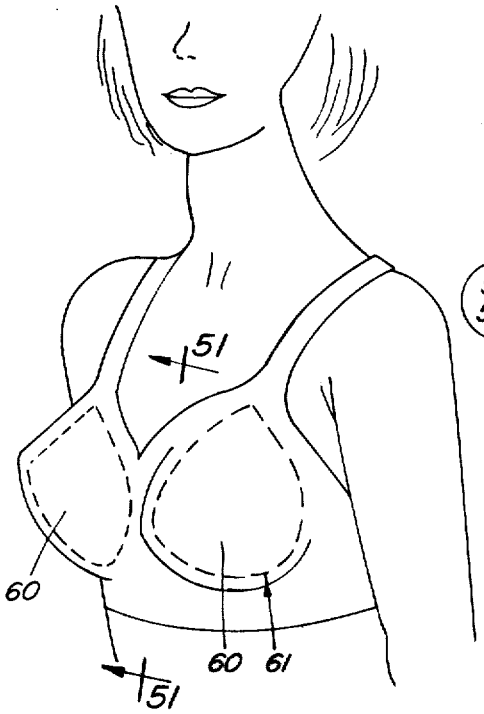
FIG. 50 is a perspective view illustrating a brassiere having the form of one of the so-called full-inflation breast pads shown in FIGS. 23 to 49, inclusive, arranged in the cloth cups of the brassiere.
Figure 51:
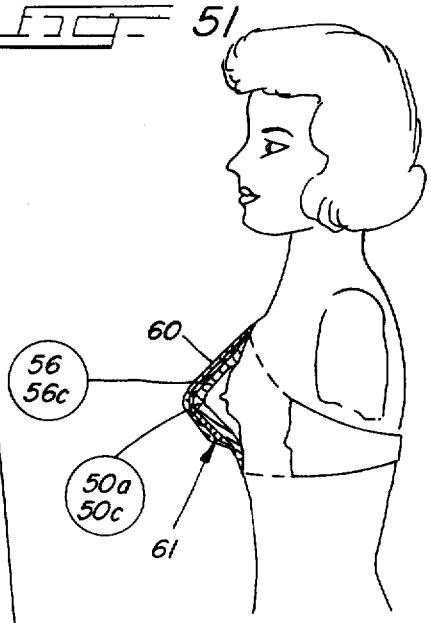
FIG. 51 is a sectional view on line 51—51 in FIG. 50.

The new full-inflation brassiere pad thus formed (as in FIGS. 23–40 or FIGS. 41–49) has the desired fullness, indicated in FIGS. 50 and 51 of the drawings, wherein the new full-inflation brassiere pad, embodying either the form of the invention illustrated in FIGS. 23 to 40, inclusive, or that illustrated in FIGS. 41 to 49, inclusive, is shown as being arranged in the cloth cups 60 of a brassiere 61 so as to impart the desired fullness to the outer cloth cups 60 of the brassiere 61 while, at the same time, providing a relatively small breast-receiving pocket (56 or 56c) in the new full-inflation brassiere pad, for use by girls or women having relatively small busts.

In addition to the advantages referred to above, the new stitched and molded or formed brassiere pad has the additional advantage which resides in the fact that it imparts a convex curvature to that section of the new brassiere pad which lies above the horizontal midline thereof, as well as to that section thereof which lies below the horizontal midline of the brassiere pad, and thus has the advantage in use of imparting to the outer cloth brassiere cup of the brassiere in which the new brassiere pad is used for the intended or built-in outwardly convex design and shape of the outer cloth cup of the brassiere, as distinguished from the straight or somewhat inwardly concave outer surfaces imparted to the outer cloth cup of the brassiere by comparable prior art stitched but unmolded brassiere pads made of bonded nonwoven fibrous batting composed of polyester fibers, as described above.

It will thus be seen from the foregoing description, considered in conjunction with the accompanying drawings, that the present invention provides a new and improved stitched and molded brassiere pad and a new and improved method of making the same, and thus has the desirable advantages and characteristics and accomplishes its intended objects including those hereinbefore pointed out and others which are inherent in the invention.

I claim:

1. A brassiere pad formed from a blank of bonded nonwoven fibrous batting having rough fluffy surfaces and cut, sized and shaped to provide panels having complementary abutting marginal edge portions stitched together and molded into the shape of a brassiere pad having inner and outer surfaces, at least one of the said surfaces of the said brassiere pad having a smooth skin-like surface formed in the body of the said nonwoven fibrous batting.

2. A brassiere pad as defined in claim 1 in which the said bonded nonwoven fibrous batting is composed of polyester fiber.

3. A brassiere pad formed from a blank of bonded nonwoven fibrous batting having relatively rough fluffy surfaces and cut, sized and shaped to provide panels having complementary abutting marginal edge portions stitched together and molded into the shape of a brassiere pad having inner and outer surfaces, the outer surface of said brassiere pad having a somewhat convex outwardly smooth skin-like surface formed in the body of the said nonwoven fibrous batting.

4. A brassiere pad formed from a blank of bonded nonwoven fibrous batting having relatively rough fluffy surfaces and cut, sized and shaped to provide panels having complementary abutting marginal edge portions stitched together and molded into the shape of a brassiere pad having inner and outer surfaces, both the inner and outer surfaces of said brassiere pad having a somewhat convex outwardly smooth skin-like surface formed in the body of the said nonwoven fibrous batting.

5. A contour brassiere pad formed from a blank of bonded nonwoven fibrous batting having relatively rough fluffy surfaces and cut, sized and shaped to provide panels having complementary abutting marginal edge portions stitched together and molded into the shape of a brassiere pad having inner and outer surfaces, both the inner and outer surfaces of said brassiere pad having a somewhat convex outwardly smooth skin-like surface formed in the body of the said nonwoven fibrous batting.

6. A brassiere pad formed from a blank of bonded nonwoven fibrous batting having rough fluffy surfaces and cut, sized and shaped to provide panels having complementary abutting marginal edge portions stitched together and molded into the shape of a brassiere pad having inner and outer surfaces, at least one of the said surfaces of the said brassiere pad having a smooth skin-like surface, the other surface of said brassiere pad retaining the rough fluffy surface of the said bonded nonwoven fibrous batting formed in the body of the said nonwoven fibrous batting.

7. A full-inflation brassiere cup pad formed from an outer blank of bonded nonwoven fibrous batting having rough fluffy surfaces cut and shaped and to provide an outer panel having complementary abutting marginal edge portions stitched together to provide an outer brassiere pad liner, and an inner blank complementary in shape to the said outer blank but somewhat smaller in size than the said outer blank and being cut, shaped, folded and stitched to provide an inner brassiere pad liner, the said inner brassiere pad liner being assembled within and being closely nested in the said outer brassiere pad liner and the said outer liner and the said inner liner being stitched together and molded into the shape of a full-inflation brassiere pad having inner and outer surfaces, at least one of the said surfaces of said full-inflation brassiere pad having a smooth skin-like surface; the said full-inflation brassiere pad having a relatively small breast-receiving pocket therein but being relatively thick and massive in size so as to substantially fill the cloth cup of a brassiere into which the said full-inflation brassiere pad may be inserted for use by girls and women having relatively small busts.

8. A full-inflation brassiere pad as defined in claim 7 in which the outer surface of the said outer liner thereof has a smooth, skin-like outer surface.

9. A full-inflation brassiere pad as defined in claim 7 in which the inner surface of the said inner liner has a smooth, skin-like surface.

10. A full-inflation brassiere pad as defined in claim 7 in which the outer surface of the said outer liner has a smooth, skin-like outer surface and in which the inner surface of the said inner liner also has a smooth, skin-like inner surface.

11. A method of making a brassiere pad from bonded nonwoven fibrous batting of preselected thickness formed of multidirectional polyester fiber deep bonded with a thermoplastic resinous binder and having relatively rough fluffy surfaces which comprises the steps of cutting a blank body of the batting into suitable size and shape to provide panels having complementary marginal edge portions, abutting the said marginal edge portions together, stitching the said complementary abutted marginal edge portions together to provide a partially formed stitched but unmolded brassiere pad, subjecting the thus stitched and partially formed brassiere pad to heat and pressure in a mold so as to soften the said thermoplastic binder and compress the said polyester fiber batting into the form of a completed brassiere pad having inner and outer surfaces and so as to substantially reduce the thickness of the said blank body from its pre-selected original thickness while, at the same time, imparting a smooth skin-like surface to at least one of said surfaces thereof and in the body of the said nonwoven fibrous batting.

12. A method of making a brassiere pad as defined in claim 11 in which the stitched and partially formed brassiere pad has a smooth skin-like outer surface imparted thereto during the molding operation.

13. A method of making a brassiere pad as defined in claim 11 in which the stitched and partially formed brassiere pad has a smooth skin-like inner surface imparted thereto during the molding operation.

14. A method of making a brassiere pad from bonded nonwoven fibrous batting of preselected thickness formed of multidirectional polyester fiber deep bonded with a thermoplastic resinous adhesive binder and having relatively rough fluffy surfaces which comprises the steps of cutting a blank body of the batting into suitable size and shape to provide an outer panel having complementary marginal edge portions and an inner panel having complementary marginal edge portions, stitching the said complementary marginal edge portions of the said outer panel together and stitching the said marginal edge portions of the said inner panel together, inserting the said stitched inner panel into the said stitched outer panel in closely nested relationship, stitching the said inner liner and the said outer liner together to provide a partially formed stitched but unmolded brassiere pad, subjecting the thus stitched and partially formed brassiere pad to heat and pressure in a mold so as to soften the said thermoplastic resinous binder and compress the said polyester fiber batting to form a completed brassiere pad having inner and outer surfaces and so as to substantially reduce the thickness of the said blank body from its pre-selected original thickness while, at the same time, imparting a smooth skin-like surface to at least one of said surfaces thereof, and while retaining in the other surface of the completed brassiere pad the relatively rough fluffy surface of the bonded nonwoven fibrous batting from which it is made.

15. A method of making a brassiere pad from bonded nonwoven fibrous batting of preselected thickness formed of bonded polyester fiber and having relatively rough fluffy surfaces which comprises the steps of cutting a blank body of the batting into suitable size and shape to provide inner and outer panels, shaping and stitching the said outer panel to form an outer brassiere pad liner and shaping and stitching the said inner liner to form an inner brassiere pad liner, stitching the said stitched outer and inner liners together to provide a partially formed stitched but unmolded brassiere pad, subjecting the thus stitched and partially formed brassiere pad to heat and pressure in a mold so as to form a completed brassiere pad having inner and outer surfaces and so as to substantially reduce the thickness of the said blank body from its preselected original thickness while, at the same time, imparting a smooth skin-like surface to at least one of the inner and outer surfaces of the said brassiere pad and in the body of the said nonwoven fibrous batting.

16. A method of making a so-called full-inflation brassiere pad of bonded nonwoven fibrous batting of preselected and relatively massive thickness and formed of polyester fiber and having relatively rough fluffy inner and outer surfaces, which comprises the steps of cutting blank bodies of the said batting to suitable size and shape to provide inner and outer liner panels each having complementary marginal edge portions, folding the said inner liner panel upon itself so as to bring the complementary margin edge portions thereof into mating relationship, stitching the thus mated marginal edge portions of the inner panel together to provide an inner liner unit for the said brassiere pad, shaping the said outer liner panel so as to bring the said complementary marginal edge portions thereof into abutting relationship, stitching the thus abutted marginal edge portions of the said outer liner panel together to provide an outer liner for the said brassiere pad, inserting the said folded and stitched inner liner into the said shaped and stitched outer liner and into closely nested assembled relationship therein, stitching the said outer liner and the said inner liner together in assembled relationship, and then subjecting the thus assembled and stitched outer liner and inner liner to heat and pressure in a mold so as to form a completed full-inflation brassiere pad having inner and outer liners substantially reduced in thickness from the thickness of the said outer and inner blanks while, at the same time, imparting a smooth skin-like surface to at least one surface of the thus completed full-inflation brassiere pad.

17. A method of making a full-inflation brassiere pad as defined in claim 16 in which the said smooth skin-like surface is imparted to the outer surface of the said outer liner.

18. A method of making a full-inflation brassiere pad as defined in claim 16 in which the said smooth skin-like surface is imparted to the inner surface of the said inner liner of the brassiere pad.

19. A method of making a so-called full-inflation brassiere pad of bonded nonwoven fibrous batting of preselected and relatively massive thickness and formed of polyester fiber and having relatively rough fluffy inner and outer surfaces, which comprises the steps of cutting blank bodies of the said batting to suitable size and shape to provide inner and outer liner panels each having complementary marginal edge portions, folding the said inner liner panel upon itself so as to bring the complementary marginal edge portions thereof into mating relationship, stitching the thus mated marginal edge portions of the inner panel together to provide an inner liner unit for the said brassiere pad, shaping the said outer liner panel so as to bring the said complementary marginal edge portions thereof into abutting relationship, stitching the thus abutted marginal edge portions of the said outer liner panel together to provide an outer liner for the said brassiere pad, inserting the said folded and stitched inner liner into the said shaped and stitched outer liner and into closely nested assembled relationship therein, stitching the said outer liner and the said inner liner together in assembled relationship, and then subjecting the thus assembled and stitched outer liner and inner liner to heat and pressure in a mold so as to form a completed full-inflation brassiere pad having inner and outer liners substantially reduced in thickness relative to the thickness of the said outer and inner blanks while, at the same time, imparting a smooth skin-like surface to both the outer surface of the said outer liner and to the inner surface of the said inner liner of the said brassiere pad.

20. The method of making a full-inflation brassiere pad in accordance with the method defined in claim 14, and in which a channel is formed on the inner surface of the said outer panel inwardly of and extending longitudinally of the said stitched marginal edge portions of the said outer panel, and in which the stitching of the marginal edge portion of the said inner panel is disposed inwardly of the outer edges thereof to provide a rib portion extending longitudinally of the stitching on the inner surface of the said inner liner, and in which the said rib portion of the said inner liner is forced into the said channel in the said outer liner during the said molding operation.

21. A method of making a so-called full brassiere pad, in accordance with the method defined in claim 11, in which the initial thickness of the bonded nonwoven fibrous batting material employed is in the order of about ¾" to about 1" and in which the thickness of the completed molded full brassiere pad after the completion of the molding operation is in the order of about ⅜" to about ⅝".

22. A method of making a contour brassiere pad, in accordance with the method defined in claim 11, in which the initial thickness of the bonded nonwoven fibrous batting material employed is in the order of from about ¾" to about 1" and in which the thickness of the completed molded contour brassiere pad after the completion of the molding operation is in the order of about from ⅛" to about ¼".

23. A method of making a full-inflation brassiere pad, in accordance with the method defined in claim 14, in which the total initial thickness of the double ply bonded nonwoven fibrous batting material employed is in the order of from about 1½" to about 1¾" and in which the thickness of the completed molded full-inflation brassiere pad after the completion of the molding operation is in the order of from about 1¼" to about 1½".

24. The method of making a full-inflation brassiere pad, in accordance with the method defined in claim 23, in which the double ply bonded nonwoven fibrous batting material employed consists of two plies of said batting material each having an initial thickness of from about ¾" to about 1⅛".

*25. A brassiere pad formed from a blank of bonded non-woven fibrous batting having relatively rough fluffy surfaces and cut, sized and shaped to provide panels having complementary marginal edge portions secured together and molded into the shape of a brassiere pad having inner and outer surfaces; at least one of said surfaces of said brassiere pad having a smooth skin-like surface formed in the body of the said non-woven fibrous batting.*

*26. A brassiere pad formed from a blank of bonded non-woven fibrous batting having a rough fluffy surfaces and cut, sized and shaped to provide panels having portions fastened together and molded into the shape of a brassiere pad having inner and outer surfaces; at least one of the said surfaces of the said brassiere pad having a smooth skin-like surface; the other surface of said brassiere pad retaining the rough fluffy surface of the said bonded non-woven fibrous batting formed in the body of the said non-woven fibrous batting.*

*27. A method of making a brassiere pad from bonded non-woven fibrous batting of pre-selected thickness formed of multi-directional fiber deep-bonded with a thermoplastic resinous binder and having relatively rough fluffy surfaces, which comprises the steps of*

*(a) cutting a blank body of the batting into suitable size and shape to provide panels having attaching portions;*

*(b) fastening the said attaching portions together to provide a partially formed but unmolded brassiere pad;*

*(c) subjecting the thus partially formed brassiere pad to heat and pressure in a mold so as to soften the said thermoplastic binder and compress the said fibrous batting into the form of a completed brassiere pad having inner and outer surfaces and so as to substantially reduce the thickness of the said blank body from its pre-selected original thickness while, at the same time, imparting a smooth skin-like surface to at least one of said surfaces thereof and in the body of the said non-woven fibrous batting.*

References Cited

The following references, cited by the Examiner, are of record in the patented file of this patent or the original patent.

UNITED STATES PATENTS

| | | | |
|---|---|---|---|
| 3,164,655 | 1/1965 | Howard et al. | 264—321 |
| 3,181,536 | 5/1965 | Cannata | 128—481 |
| 3,348,549 | 10/1967 | Brodmann et al. | 128—481 |
| 3,312,224 | 4/1967 | Coates et al. | 128—516 |
| 2,401,180 | 5/1946 | Parmelee | 264—134 |
| 2,897,821 | 8/1959 | Lerner | 128—481 |
| 3,181,536 | 5/1965 | Cannatg | 128—481 |

ADELE M. EAGER, Primary Examiner

U.S. Cl. X.R.

3—36; 128—516; 264—291